Jan. 5, 1937.   N. SANTUCCI   2,066,650
PIPE TESTING PLUG
Filed July 11, 1934

Inventor:
Nicholas Santucci
By Cromwell, Griest + Warden
attys.

Patented Jan. 5, 1937

2,066,650

UNITED STATES PATENT OFFICE 2,066,650

PIPE TESTING PLUG

Nicholas Santucci, Niles Center, Ill.

Application July 11, 1934, Serial No. 734,578

5 Claims. (Cl. 138—90)

The present invention relates to pipe testing plugs adapted for use in testing water mains and the like.

It is the practice, upon completion of a section of a water main or similar pipe equipment which is buried in the ground or in inaccessible places, to apply pressure to the same to test it before connecting it into service. In the past, this has been accomplished by the use of large heavy plugs at the end of the pipe and to apply pressure to the pipe by some convenient means to determine whether or not it is in proper condition. Where large pipe is employed these plugs are heavy, are generally hauled with a truck and are difficult to handle.

The primary object of the present invention is the provision of a pipe testing plug which is easy to use, comparatively light in weight and relatively inexpensive.

A preferred embodiment of this invention is shown in the accompanying drawing. It is to be understood, however, that the form shown in the drawing and hereinafter described is for purposes of illustration and is not to be construed as unnecessarily limiting the scope of the appended claims.

Referring to the drawing.

Figure 1:
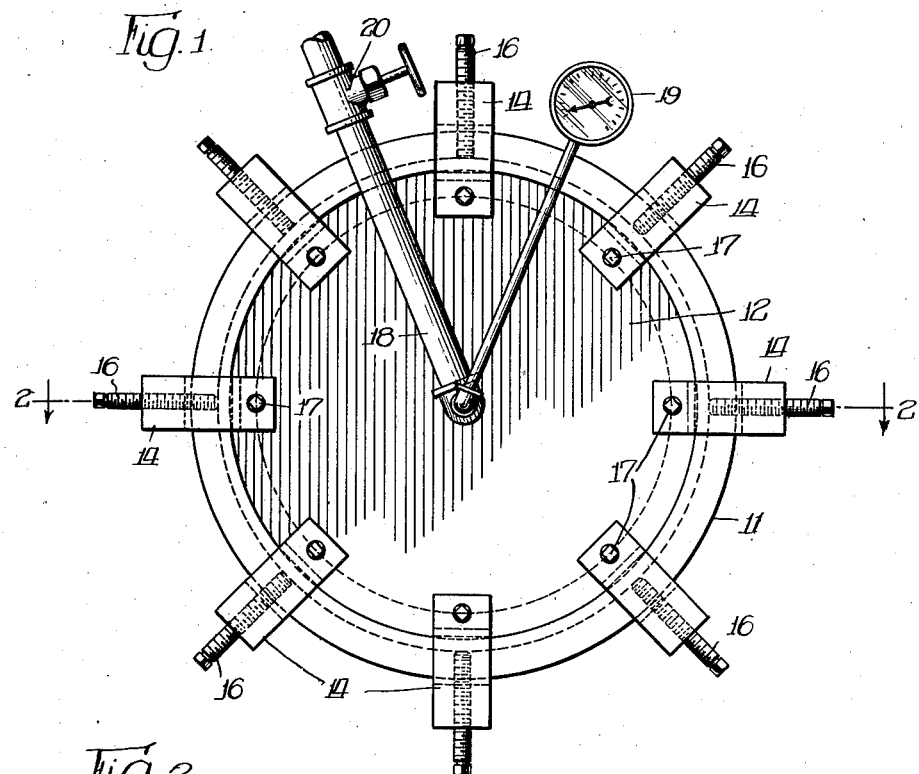
Fig. 1 is a view in elevation showing the device in place at the end of a pipe.
Figure 2:
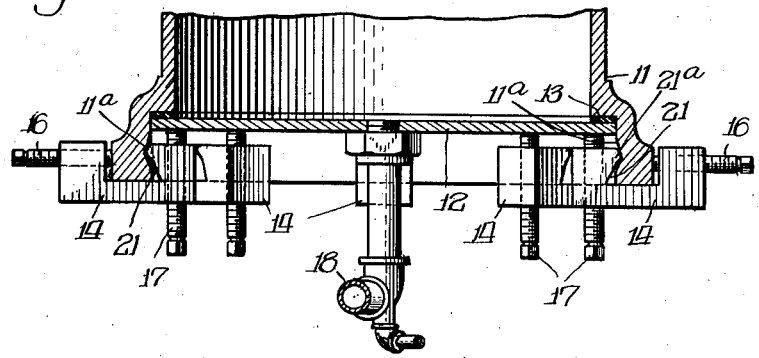
Fig. 2 is a section on the line 2—2 of Fig. 1.
Figure 3:
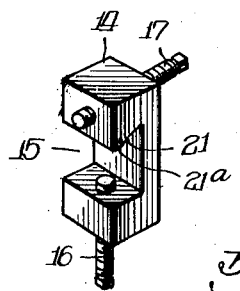
Fig. 3 is a detailed view of a clamp member.

In the drawing, the reference numeral 11 indicates the end of a pipe which is shown with the usual bell commonly provided on the ends of pipe of relatively large diameter. It is to be noted that the bell is provided with an annular groove 11a on its inside face which is provided in pipe of this character to receive the packing. A plate member 12, which is circular in shape, fits inside of the bell at the end of the pipe and abuts against the gasket 13, the latter being interposed between the pipe and the plate 12. The plate 12 is secured in place by a plurality of clamping members 14. The clamping members 14 may be cut from solid stock and are provided with a recess 15 of sufficient depth to go over the edge of the bell of the pipe. A bolt 16 extends longitudinally of the clamp and passes into the recess to engage the end of the pipe and firmly hold the clamp in place. A second bolt 17, which passes through the clamp at right angles to the bolt 16, screws into contact with the plate 12. By providing a plurality of the clamps around the pipe, as shown in Fig. 2, the plate 12 is securely sealed in place. It is to be observed that the walls of the recess are not parallel and while the one containing the bolt 16 may be at right angles to the base of the recess, the opposite wall 21 is undercut or at an angle of less than 90° to the base of the recess 15 and the upper edge is provided with a projection 21a which is shaped to conform to the annular groove 11a of the pipe. The projection 21a interfits with the annular groove and prohibits the clamp from slipping.

In order to test the pipe, water or air pressure may be supplied through the pipe 18 which is secured to the center of the plate 12. A pressure gauge 19 may be affixed to the pipe 18 so as to indicate to the operator the amount of pressure that has been created in the pipe being tested. A valve 20 is provided in the small pipe 18 so that the water or air being forced into the pipe 11 may be shut off.

In ordinary practice, after a section of water main has been constructed, a plug constructed in accordance with the present invention may be put in place, pressure created within the main, the supply pipe 18 shut off and if the main continues to hold its pressure over a reasonable period of time it is certain that the joints are all tight and the main is ready to be connected to the central system. Should there be any weakness in the main this fact will be brought to light and it may be corrected before the main is finally buried.

One of the features of my invention is the fact that the clamps may be used on various sizes of pipe, it only being necessary to add more clamps for larger pipe and to supply different sized plates for the various pipe sizes. This is a feature of considerable importance as the plugs which are used at the present time are very expensive and it is necessary to provide a great many of them to fit different sized pipe, whereas by employing a set of clamps constructed in accordance with the present invention the same may be used on a wide range of pipe sizes.

I claim:

1. A pipe testing plug comprising a disk member adapted to fit into the end of a pipe, a plurality of clamping members for engaging the end of a pipe, said clamping members having a recess therein to receive the pipe flange, a bolt member passing in a longitudinal direction into said recess to engage the pipe and a second bolt member passing through said clamp at a right angle to said first mentioned bolt member to engage said disk.

2. A pipe testing plug comprising a disk, a plurality of clamping members for engaging the end of a pipe, said clamping members having a recess therein to receive the pipe flange, a bolt member passing in a longitudinal direction into said recess to engage the pipe, a gasket interposed between said disk and the pipe, and a clamp screw mounted in said clamping members to engage said disk and hold the same firmly in the end of a pipe.

3. A pipe testing plug comprising a disk member adapted to fit into the end of a pipe and engage the flanged portion thereof, a plurality of clamping members for engaging the end of a pipe, said clamping members having a body portion with a recess therein, one of the walls bounding said recess being undercut, a bolt extending longitudinally of said clamp and passing into said recess to engage the side walls of the pipe and a second bolt mounted in angular relationship to the first mentioned bolt and adapted to engage said disk.

4. A pipe testing plug comprising a disk member adapted to fit into the end of a pipe, a plurality of clamping members for engaging the end of a pipe, said clamping members having a body portion with a recess therein to receive the edge of the pipe, a bolt passing into said recess to engage the pipe, and a second bolt passing through said body portion in angular relationship to said first mentioned bolt to engage said disk member.

5. A pipe testing plug comprising a disk member adapted to fit into the end of a pipe, a plurality of clamping members for engaging the end of a pipe, said clamping members having a body portion with a recess therein, one of the walls bounding said recess being undercut, a bolt extending longitudinally of said clamps and passing into said recess to engage the pipe and a second bolt member mounted in angular relationship to said first mentioned bolt member and engaging said disk, said undercut wall of said clamping members being provided with a projection adapted to interfit with a groove in the pipe.

NICHOLAS SANTUCCI.